United States Patent
Lawrence (10) Patent No.: US 11,647,392 B1
(45) Date of Patent: May 9, 2023

(54) SYSTEMS AND METHODS FOR CONTEXT-AWARE MOBILE APPLICATION SESSION PROTECTION

(71) Applicant: BANK OF AMERICA CORPORATION, Charlotte, NC (US)

(72) Inventor: Myles Lawrence, Camberley (GB)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/644,648

(22) Filed: Dec. 16, 2021

(51) Int. Cl.
| | |
|---|---|
| *H04W 12/30* | (2021.01) |
| *H04M 1/72454* | (2021.01) |
| *G06F 3/01* | (2006.01) |
| *G06F 3/041* | (2006.01) |
| *G06F 3/04886* | (2022.01) |
| *G06F 21/31* | (2013.01) |
| *G06F 3/04883* | (2022.01) |

(52) U.S. Cl.
CPC ............ *H04W 12/30* (2021.01); *G06F 3/013* (2013.01); *G06F 3/0416* (2013.01); *G06F 3/04883* (2013.01); *G06F 21/31* (2013.01); *H04M 1/72454* (2021.01); *H04M 2250/12* (2013.01)

(58) Field of Classification Search
CPC .... G06F 3/013; G06F 3/0416; G06F 3/04883; G06F 21/31; H04W 12/30; H04M 1/72454; H04M 2250/12
See application file for complete search history.

(56) References Cited

U.S. PATENT DOCUMENTS

| | | | |
|---|---|---|---|
| 7,565,529 B2 | 7/2009 | Beck et al. |
| 7,624,267 B2 | 11/2009 | Huang et al. |
| 7,913,096 B2 | 3/2011 | Leone |
| 7,921,209 B2 | 4/2011 | Hammell |
| 7,924,139 B2 | 4/2011 | Sasakura |
| 8,090,364 B2 | 1/2012 | Delalat |
| 8,155,319 B2 | 4/2012 | Viala |
| 8,327,435 B2 | 12/2012 | Bogineni |
| 8,412,157 B2 | 4/2013 | Wang |
| 8,466,773 B2 | 6/2013 | Willgert |
| 8,565,764 B2 | 10/2013 | Pudney |
| 8,600,355 B1 | 12/2013 | Sadhvani |
| 8,713,320 B2 | 4/2014 | Xu |
| 8,787,902 B2 | 7/2014 | Kim |
| 8,797,138 B2 | 8/2014 | Myers |
| 8,839,380 B2 | 9/2014 | Kisters |

(Continued)

*Primary Examiner* — Ryan A Lubit (57) ABSTRACT

A method for securing a mobile device includes determining whether the mobile device is unlocked whether a user is logged into a mobile application running on the mobile device. The method further includes determining, when the mobile device is unlocked while the user is logged into the mobile application, whether the mobile device is currently in a threat scenario by analyzing data from one or more sensors. The threat scenario indicates that the mobile device is exposed to unintended and malicious interactions. The method further includes displaying, when it is determined that the mobile device is currently in the threat scenario, a step-up authentication screen that replaces or at least partially covers an application screen of the mobile application. The method further includes restoring the application screen of the mobile application in response to receiving a valid authentication input from the user on the step-up authentication screen.

20 Claims, 3 Drawing Sheets

(56) References Cited

U.S. PATENT DOCUMENTS

| | | |
|---|---|---|
| 8,862,097 B2 | 10/2014 | Brand |
| 8,874,077 B2 | 10/2014 | Bergenwall |
| 8,881,235 B2 | 11/2014 | Muller |
| 8,893,234 B2 | 11/2014 | Morel |
| 8,922,480 B1 * | 12/2014 | Freed .................. G06F 21/6245 382/103 |
| 8,947,355 B1 * | 2/2015 | Karakotsios .......... G06F 3/0485 345/158 |
| 9,020,467 B2 | 4/2015 | Zhang |
| 9,037,851 B2 | 5/2015 | Choi |
| 9,088,891 B2 | 7/2015 | Belton |
| 9,143,922 B2 | 9/2015 | Veneroso |
| 9,262,460 B2 | 2/2016 | Hanke |
| 9,268,545 B2 | 2/2016 | Lortz |
| 9,319,882 B2 | 4/2016 | Berard |
| 9,326,142 B2 | 4/2016 | Norrman |
| 9,344,884 B2 | 5/2016 | Muller |
| 9,454,657 B2 | 9/2016 | Yeap |
| 9,479,514 B2 | 10/2016 | Tan |
| 9,584,514 B2 | 2/2017 | Franciscus |
| 9,646,148 B2 | 5/2017 | Wang |
| 9,668,139 B2 | 5/2017 | Thakare |
| 9,686,399 B2 | 6/2017 | Blom |
| 9,769,172 B2 | 9/2017 | Hunukum |
| 9,779,568 B2 | 10/2017 | Muller |
| 9,788,209 B2 | 10/2017 | Hauck |
| 9,865,112 B2 | 1/2018 | Maiwand |
| 9,870,665 B2 | 1/2018 | Maiwand |
| 9,902,368 B2 | 2/2018 | Maiwand |
| 10,244,395 B2 | 3/2019 | Weidenfeller |
| 10,303,868 B2 | 5/2019 | Weber |
| 10,382,206 B2 | 8/2019 | Muhanna |
| 10,440,034 B2 | 10/2019 | Von Hauck |
| 10,475,264 B2 | 11/2019 | Jin |
| 10,587,614 B2 | 3/2020 | Brown |
| 10,716,002 B2 | 7/2020 | Rajadurai |
| 10,856,148 B2 | 12/2020 | Li et al. |
| 10,873,464 B2 | 12/2020 | Muhanna |
| 2010/0205667 A1 * | 8/2010 | Anderson ............... G06F 3/017 726/19 |
| 2011/0159850 A1 | 6/2011 | Faith et al. |
| 2017/0020635 A1 | 1/2017 | Svoboda |
| 2019/0108330 A1 | 4/2019 | Sikder et al. |
| 2020/0228645 A1 * | 7/2020 | Alberth, Jr. .......... G01C 21/206 |
| 2021/0342008 A1 * | 11/2021 | Sachidanandam .... G06F 3/0346 |

* cited by examiner

SYSTEMS AND METHODS FOR CONTEXT-AWARE MOBILE APPLICATION SESSION PROTECTION

TECHNICAL FIELD

The present disclosure relates generally to information security, and more specifically to systems and methods for providing context-aware mobile application session protection.

BACKGROUND

Unintended and unauthorized interactions with mobile applications running on a mobile device present security threats to users and organizations. For example, an unauthorized actor may seize an unlocked mobile device and proceed to interact with a mobile application running on the mobile device. As another example, an unlocked mobile device may register unintentional touches that result in interactions with a mobile application when the mobile device is placed into a pocket of a user. As yet another example, a mobile device may be unintentionally unlocked via a connected device such as a smartwatch, thereby permitting an unauthorized actor to interact with a mobile application on the mobile device.

SUMMARY

Unintended and unauthorized interactions with mobile applications running on a mobile device present security threats to users and organizations. For example, an unauthorized actor may seize an unlocked mobile device and proceed to interact with a mobile application running on the mobile device. As another example, an unlocked mobile device may register unintentional touches that result in interactions with a mobile application when the mobile device is placed into a pocket of a user. As yet another example, a mobile device may be unintentionally unlocked via a connected device such as a smartwatch, thereby permitting an unauthorized actor to interact with a mobile application on the mobile device.

To address these and other problems with unsecured mobile applications running on a mobile device, this disclosure contemplates systems and methods for protecting mobile application sessions using context-aware step-up authentication. Once a mobile device is determined to be in a threat scenario that may permit unintended or malicious interactions with the mobile device, the disclosed embodiments take proactive actions to prevent unintended or malicious interactions with the mobile application. For example, the disclosed embodiments may monitor for a threat scenario where a user is logged into a mobile application and then the mobile device is placed inside a pocket or purse for a period of time without being locked. As another example, the disclosed embodiments may monitor for a threat scenario where a user is logged into a mobile application and then the mobile device is laid down without any further interactions for a period of time without being locked. Once these or other threat scenarios are detected, embodiments may proactively place a masking screen over a current screen of the mobile application. Once a user interacts with the masking screen, the disclosed embodiments may present a step-up authentication screen to allow the user to present credentials (e.g., a personal identification number, password, biometrics, etc.) in order to resume the mobile application session. As a result, the mobile application may be protected from unintended or malicious interactions and personal/sensitive information of a user may be protected.

By protecting mobile application sessions using context-aware step-up authentication, the disclosed embodiments mitigate many risks associated with mobile applications running on a mobile device. For example, the context-aware step-up authentication provided by the disclosed embodiments may mitigate risks such as 1) a situation where a mobile device has been stolen while in use (i.e., unlocked); 2) a situation where a mobile device is in a sleep mode (e.g., a blank screen) but is not locked (e.g., from an insecure mobile operating system configuration); 3) a situation where a mobile device has be unintentionally unlocked via a connected device (e.g., a smart watch); 4) a situation where a mobile device has been exploited using a smart/locale based unlock; 5) a situation where a mobile device has been unlocked via location spoofing, (e.g., a malicious actor has brought a mobile device to, or has acquired a mobile device within, a boundary of a trusted place where the mobile device will not be locked); and 6) a situation where a mobile device is currently connected to another device that is preventing the mobile device from being locked (e.g., connected to Bluetooth headphones). Furthermore, the context-aware step-up authentication provided by the disclosed embodiments may mitigate risks of a mobile device being exploited via insecure convenience features that have been installed or enabled on a "jailbroken" device.

In one embodiment, a method for securing a mobile computing device includes determining whether a mobile computing device is unlocked and determining whether a user is logged into a mobile application running on the mobile computing device. The method further includes determining, when the mobile computing device is unlocked while the user is logged into the mobile application, whether the mobile computing device is currently in a threat scenario by analyzing data from one or more sensors. The threat scenario indicates that the mobile computing device is exposed to unintended and malicious interactions. The method further includes displaying, when it is determined that the mobile computing device is currently in the threat scenario, a step-up authentication screen that replaces or at least partially covers an application screen of the mobile application. The method further includes restoring the application screen of the mobile application in response to receiving a valid authentication input from the user on the step-up authentication screen.

A practical application of the context-aware mobile application session protection system and methods described herein is that a mobile application may be able to predict when a mobile device is exposed to unintended or malicious interactions and thereby take automatic actions to prevent the unintended or malicious interactions with the mobile application. In this manner, computing resources (e.g., processor, memory, and/or network resources) are not wasted handling network traffic and operations that are typical with unintended and malicious interactions. By reducing or eliminating altogether network operations and traffic associated with unintended and malicious interactions, data loss may also be reduced, thereby improving the efficiency of computing systems. In addition, resources such as electricity may be preserved by preventing the additional computing resources typically associated with unintended and malicious interactions. Furthermore, device and network security may be increased by automatically taking actions to secure a mobile application when it is determined that the mobile device is exposed to unintended or malicious interactions. For example, a mobile application that is automatically secured may prevent malicious actors from breaching the mobile application (and in turn, other computing systems that may communicate with the mobile computing device over a network), thereby preventing possible data security events.

Embodiments of the present disclosure provide technological solutions to technological problems. For example, the disclosed embodiments automatically prevent access to a mobile application when it is determined that the mobile device is experiencing a threat scenario that may permit unintended or malicious interactions with the mobile application. As a specific example, embodiments may proactively place a masking screen over an application screen of a mobile application when it is determined that a user is logged into the mobile application and then the mobile device is placed inside a pocket or purse for a period of time without being locked. As a result, the mobile application may be protected from possible unintended interactions. This conserves computing resources such as processing power and memory that is typically required by unintended interactions. Furthermore, network bandwidth may be conserved by avoiding the network traffic that is typical of unintended or malicious interactions. Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Unintended and unauthorized interactions with mobile applications running on a mobile device present security threats to users and organizations. For example, an unauthorized actor may seize an unlocked mobile device and proceed to interact with a mobile application running on the mobile device. As another example, an unlocked mobile device may register unintentional touches that result in interactions with a mobile application when the mobile device is placed into a pocket of a user. As yet another example, a mobile device may be unintentionally unlocked via a connected device such as a smartwatch, thereby permitting an unauthorized actor to interact with a mobile application on the mobile device.

To address these and other problems with unsecured mobile applications running on a mobile device, this disclosure contemplates systems and methods for protecting mobile application sessions using context-aware step-up authentication. Once a mobile device is determined to be in a threat scenario that may permit unintended or malicious interactions with the mobile device, the disclosed embodiments take automatically actions to prevent unintended or malicious interactions with the mobile application. For example, the disclosed embodiments may monitor for a threat scenario where a user is logged into a mobile application and then the mobile device is placed inside a pocket or purse for a period of time without being locked. As another example, the disclosed embodiments may monitor for a threat scenario where a user is logged into a mobile application and then the mobile device is laid down without any further interactions for a period of time without being locked. Once these or other threat scenarios are detected, embodiments may proactively place a masking screen over a current screen of the mobile application. Once a user interacts with the masking screen, the disclosed embodiments may present a step-up authentication screen to allow the user to present credentials (e.g., a personal identification number, password, biometrics, etc.) in order to resume the mobile application session. As a result, the mobile application may be protected from unintended or malicious interactions and personal/sensitive information of a user may be protected.

By protecting mobile application sessions using context-aware step-up authentication, the disclosed embodiments mitigate many risks associated with mobile applications running on a mobile device. For example, the context-aware step-up authentication provided by the disclosed embodiments may mitigate risks such as 1) a situation where a mobile device has been stolen while in use (i.e., unlocked); 2) a situation where a mobile device is in a sleep mode (e.g., a blank screen) but is not locked (e.g., from an insecure mobile operating system configuration); 3) a situation where a mobile device has be unintentionally unlocked via a connected device (e.g., a smart watch); 4) a situation where a mobile device has been exploited using a smart/locale based unlock; 5) a situation where a mobile device has been unlocked via location spoofing, (e.g., a malicious actor has brought a mobile device to, or has acquired a mobile device within, a boundary of a trusted place where the mobile device will not be locked); and 6) a situation where a mobile device is currently connected to another device that is preventing the mobile device from being locked (e.g., connected to Bluetooth headphones). Furthermore, the context-aware step-up authentication provided by the disclosed embodiments may mitigate risks of a mobile device being exploited via insecure convenience features that have been installed or enabled on a "jailbroken" device.

Figure 1:
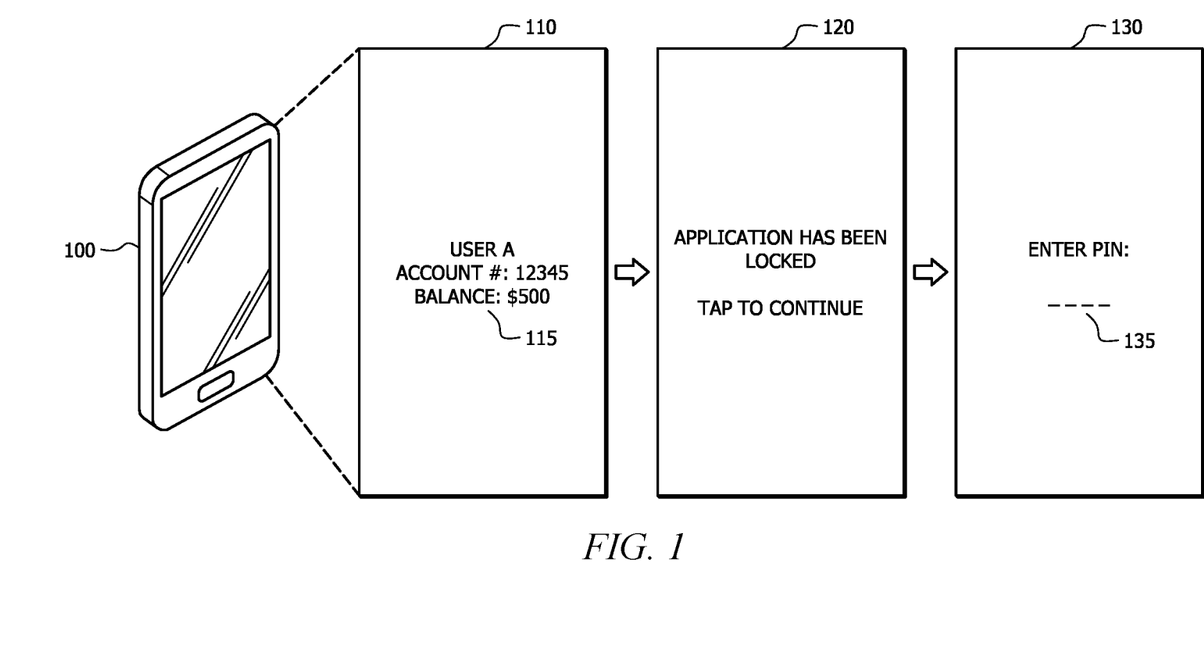
FIG. 1 illustrates an example mobile computing device for providing context-aware mobile application session protection, according to certain embodiments.
Figure 2:
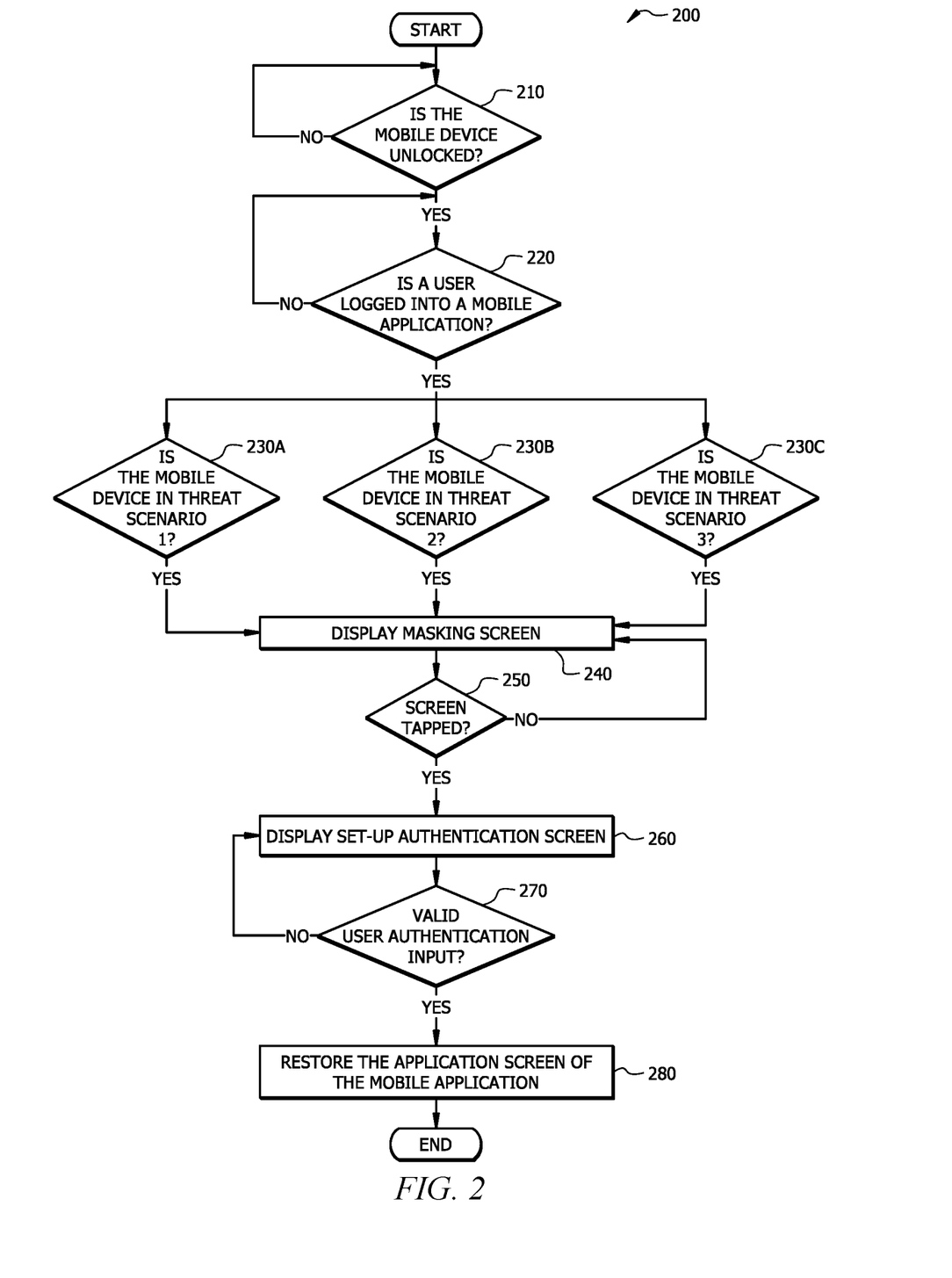
FIG. 2 is a flowchart of a method for providing context-aware mobile application session protection, according to certain embodiments.
Figure 3A:
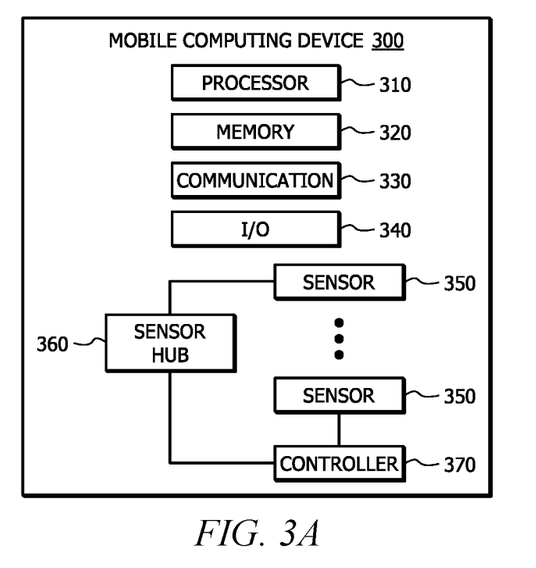
FIGS. 3A and 3B illustrate an example mobile computing device, according to certain embodiments.
Figure 3B:
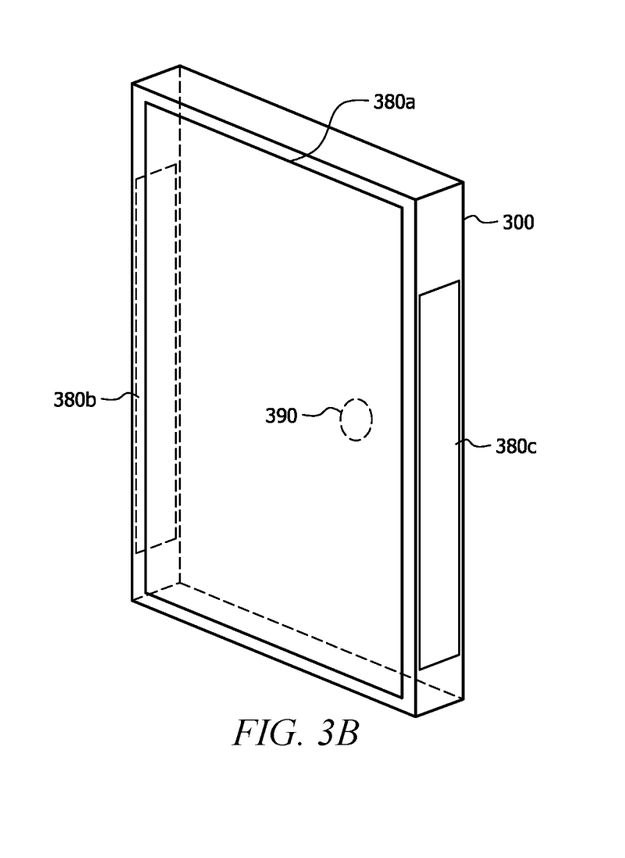

FIGS. 1 through 3B show example systems and methods for providing context-aware mobile application session protection. FIG. 1 illustrates an example mobile computing device for providing context-aware mobile application session protection. FIG. 2 illustrates an example method for providing context-aware mobile application session protection. FIGS. 3A and 3B illustrate an example mobile computing device that may be used by the systems and methods described herein.

FIG. 1 illustrates an example mobile computing device 100 for providing context-aware mobile application session protection, according to certain embodiments. In general, mobile computing device 100 monitors a mobile application running on mobile computing device 100 as well as various sensors of mobile computing device 100 in order to determine whether mobile computing device 100 is in a threat scenario that may allow unintended or malicious interactions with the mobile application. For example, the disclosed embodiments may monitor for a threat scenario where a user is logged into the mobile application and then mobile computing device 100 is placed inside a pocket or purse for a period of time without being locked. As another example, the disclosed embodiments may monitor for a threat scenario where a user is logged into the mobile application and then mobile computing device 100 is laid down without any further interactions for a period of time without being locked. Once these or other threat scenarios are detected, embodiments may proactively lock the mobile application by placing a masking screen 120 over an application screen 110 of the mobile application. This may hide sensitive information 115 that may be displayed on application screen 110 and may prevent unintended or malicious interactions with application screen 110 of the mobile application. Once a user interacts with masking screen 120 (e.g., by touching or tapping the screen of mobile computing device 100), a step-up authentication screen 130 may be displayed. Step-up authentication screen 130 allows the user to present credentials (e.g., personal identification number, password, biometrics, etc.) in an authentication input area 135 in order to unlock mobile computing device 100. As a result, an application may be protected from unintended or malicious interactions and personal/sensitive information 115 of the user may be protected.

Mobile computing device 100 may be any appropriate mobile/portable device in any suitable physical form. As example and not by way of limitation, mobile computing device 100 may be a smartphone, a tablet computer, a laptop computer, wearable computer glasses, a smartwatch, and the like. Where appropriate, mobile computing device 100 may perform without substantial spatial or temporal limitation one or more steps of one or more methods described or illustrated herein. As an example and not by way of limitation, mobile computing device 100 may perform in real time or in batch mode one or more steps of one or more methods described or illustrated herein. Mobile computing device 100 may perform at different times or at different locations one or more steps of one or more methods described or illustrated herein, where appropriate. FIGS. 3A and 3B illustrates an example mobile computing device that may be used for mobile computing device 100.

Application screen 110 is any graphical user interface (GUI) that is displayed by a mobile application running on mobile computing device 100. In some embodiments, the mobile application is a sensitive application such as an application of a financial institution, an educational provider such as a university, and the like. As such, application screen 110 may display sensitive/personal information 115 of the user. For example, sensitive/personal information 115 may include an account number, an account balance, a social security number, an educational record, etc. In some embodiments, application screen 110 may include various user inputs for performing desired tasks (e.g., transferring funds, etc.).

Masking screen 120 is any appropriate GUI for replacing or covering all or a portion of application screen 110. Masking screen 120 may have any appropriate design. In some embodiments, masking screen 120 includes an indication that the mobile application has been locked (e.g., "APPLICATION HAS BEEN LOCKED") and an instruction on how to proceed to unlock the mobile application (e.g., "TAP TO CONTINUE"). In general, masking screen 120 is displayed to lock a mobile application and to prevent unwanted or unintended interactions with application screen 110 when it is determined that mobile computing device 100 is in a threat scenario as described herein.

Step-up authentication screen 130 is a GUI that is displayed on mobile computing device 100 to allow a user to present an authentication input in authentication input area 135 in order to unlock a mobile application running on computing device 100 and gain access to application screen 110. In some embodiments, the authentication input from the user is a personal identification number, a password, or a biometric input such as a fingerprint or face scan. In embodiments where the authentication input is a biometric input, authentication input area 135 may simply be an indication to the user to present their biometric input (e.g., to hold mobile computing device 100 in a proper orientation to conduct a face scan). In some embodiments, step-up authentication screen 130 is displayed on mobile computing device 100 in response to a user input on masking screen 120 (e.g., a user touching or tapping on a display screen of mobile computing device 100). In other embodiments, step-up authentication screen 130 may be displayed as soon as it is determined that mobile computing device 100 is in a threat scenario as described herein (i.e., some embodiments may display step-up authentication screen 130 instead of masking screen 120, and step-up authentication screen 130 replaces or covers all or a portion of application screen 110).

In operation, a mobile application running on mobile computing device 100 monitors various sensors of mobile computing device 100 in order to determine whether mobile computing device 100 is in a threat scenario that may allow unintended or malicious interactions with the mobile application. In some embodiments, the mobile application first determines whether mobile computing device 100 is unlocked while a user is logged into the mobile application. If mobile computing device 100 is unlocked while the user is logged into the mobile application, the mobile application then monitors various sensors of mobile computing device 100 to determine whether mobile computing device 100 is in a threat scenario that indicates that mobile computing device 100 is exposed to unintended and malicious interactions. As a first threat scenario example, the mobile application running on computing device 100 determines whether mobile computing device 100 has been placed inside a pocket or purse for a period of time without mobile computing device 100 being locked. This first threat scenario example is described in more detail below with respect to operation 230A of method 200. As a second threat scenario example, the mobile application running on computing device 100 determines whether mobile computing device 100 has been laid down without any further interactions for a period of time without being locked. This second threat scenario example is described in more detail below with respect to operation 230B of method 200. As a third threat scenario example, the mobile application running on computing device 100 determines whether a gaze of the user with mobile computing device 100 has been lost for a period of time without mobile computing device 100 being locked. This third threat scenario example is described in more detail below with respect to operation 230C of method 200.

In some embodiments, once one of these three threat scenarios (or any other appropriate threat scenario) is detected, the mobile application running on computing device 100 may proactively lock the mobile application by placing masking screen 120 over application screen 110 of the mobile application. This may hide sensitive information 115 that may be displayed on application screen 110 and may prevent unintended or malicious interactions with application screen 110 of the mobile application. In some embodiments, once a user interacts with masking screen 120 (e.g., by touching or tapping the screen of mobile computing device 100), mobile computing device 100 displays step-up authentication screen 130. Step-up authentication screen 130 allows the user to present credentials (e.g., personal identification number, password, biometrics, etc.) in authentication input area 135 in order to unlock mobile computing device 100. As a result, the mobile application may be protected from unintended or malicious interactions and personal/sensitive information of the user may be protected.

In some embodiments, instead of displaying masking screen 120 once any threat scenario is detected, a mobile application running on computing device 100 may immediately display step-up authentication screen 130 instead of masking screen 120. In these embodiments, step-up authentication screen 130 serves the same purpose of masking screen 120—to hide sensitive information 115 that may be displayed on application screen 110 and to prevent unintended or malicious interactions with application screen 110 of the mobile application.

FIG. 2 illustrates an example method 200 for providing context-aware mobile application session protection for a mobile device, according to certain embodiments. Method 200 begins at operation 210. At operation 210, method 200 determines whether the mobile device is unlocked. In some embodiments, the mobile device is mobile computing device 100. If it is determined in operation 210 that the mobile device is unlocked, method 200 proceeds to operation 220. If it is determined in operation 210 that the mobile device is not unlocked, method 200 ends or proceeds back to the start of method 200.

At operation 220, method 200 determines if a user is logged into a mobile application. In some embodiments, the mobile application is a sensitive application that displays sensitive/personal information of the user (e.g., social security number, account number, etc.). If it is determined in operation 220 that the user is logged into the mobile application, method 200 proceeds to operations 230A-C. If it is determined in operation 220 that the user is not logged into the mobile application, method 200 ends or proceeds back to operation 210 or 220.

At operation 230A, which may be performed in parallel with operations 230B and 230C, method 200 determines whether the mobile device is in a first threat scenario that may enable unintended or malicious interactions with the mobile application of operation 220. In this operation, method 200 determines whether the mobile device has been covered by an object or placed inside a pocket, a purse, or any other object for a period of time without mobile device being locked. To do so, method 200 analyzes data from a sensor of the mobile device such as an ambient light sensor to determine whether the mobile device has been covered or placed inside an object for a predetermined amount of time. For example, if data from the ambient light sensor indicates a large, rapid decrease in the amount of detected light for five seconds, method 200 may determine that the mobile device has been covered or placed inside an object such as a pocket. If method 200 determines that the mobile device has been covered or placed inside an object such as a pocket, method 200 determines the mobile device is currently in the first threat scenario and therefore proceeds to operation 240. Otherwise, method 200 remains in operation 230A or ends.

At operation 230B, which may be performed in parallel with operations 230A and 230C, method 200 determines whether the mobile device is in a second threat scenario that may enable unintended or malicious interactions with the mobile application of operation 220. In this operation, method 200 determines whether the mobile device has been laid down without any further interactions for a period of time without being locked. To do so, method 200 analyzes data from multiple sensors of the mobile device including an accelerometer, a gyroscope, and a touchscreen sensor. First, method 200 analyzes data from one or both of the accelerometer and the gyroscope to determine whether the mobile computing device has moved within a first amount of time (e.g., five second). Next, method 200 analyzes data from the touchscreen sensor to determine whether the screen of the mobile device has been touched within a second amount of time (e.g., three second). If method 200 determines that the mobile device has not moved within the first amount of time and that the screen of the mobile device has not been touched within the second amount of time, method 200 determines the mobile device is currently in the second threat scenario and therefore proceeds to operation 240. Otherwise, method 200 remains in operation 230B or ends.

In some embodiments, operation 230B may include normalizing data from one or both of the accelerometer and the gyroscope to determine whether the mobile computing device has moved withing a first amount of time. By normalized data from sensors such as accelerometers and the gyroscopes, method 200 may be able to distinguish between false movement situations. For example, if the mobile computing device is located on a moving vehicle such as an automobile, a bus, or a train, data from the accelerometer and the gyroscope of the mobile computing device may indicate continuous or near-continuous movement, thereby falsely indicating that a user has moved the mobile computing device. By normalizing the data from such sensors, however, operation 230 may be able to eliminate such false-positive movements and be able to distinguish actual movements from the user. For example, if an accelerometer of the mobile computing devices is able to measure axes X, Y & Z, continuous movement on two of those axes alongside relative stillness on the third axis could indicate that the device is still but located inside of a moving vehicle.

At operation 230C, which may be performed in parallel with operations 230A and 230B, method 200 determines whether the mobile device is in a third threat scenario that may enable unintended or malicious interactions with the mobile application of operation 220. In this operation, method 200 determines whether a gaze of the user with the mobile device has been lost for a period of time without the mobile device being locked. To do so, method 200 analyzes data from a sensor of the mobile device such as a front-facing camera to determine whether a user's gaze has been broken for a predetermined amount of time. For example, method 200 may analyze data from the front-facing camera using an eye-tracking algorithm to determine if the user is looking away from the mobile device continuously for three seconds. If method 200 determines that the user's gaze has been broken for the predetermined amount of time, method 200 determines that the mobile device is currently in the third threat scenario and therefore proceeds to operation 240. Otherwise, method 200 remains in operation 230C or ends.

At operation 240, method 200 displays a masking screen on the mobile device. In some embodiments, the masking screen is masking screen 120. The masking screen replaces or covers (either partially or wholly) an application screen of the mobile application that is displaying sensitive information of the user. In some embodiments, the masking screen prevents any further interactions with the mobile application. In some embodiments, operation 240 may additionally include sending a request to end a to a remote server on behalf of the user. The request may effectively log the user out of the mobile application, thereby securing the mobile application until the user logs in again. After operation 240, method 200 proceeds to operation 250.

At operation 250, method 200 determines whether a user has interacted (e.g., tapped) on the masking screen of operation 240. If it is determined that user input occurred on the masking screen, method 200 proceeds to operation 260. If no user input is received in operation 250, method 200 continues displaying the masking screen in operation 240.

At operation 260, method 200 displays a step-up authentication screen on the mobile device. In some embodiments, the step-up authentication screen is step-up authentication screen 130. In some embodiments, the step-up authentication screen includes an authentication input area for receiving an authentication input from the user. In some embodiments, the authentication input area is authentication input area 135. The authentication input may be, for example, a personal identification number, a password, a biometric input, and the like. After operation 260, method 200 proceeds to operation 270.

At operation 270, method 200 determines whether a valid user authentication input was received in the authentication input area of the step-up authentication screen. For example, method 200 determines in operation 270 whether a valid personal identification number was input by the user in the authentication input area of the step-up authentication screen. As another example, method 200 determines in operation 270 whether a valid biometric input (e.g., a valid face scan) was received by the mobile device. If a valid user authentication input is received, method 200 proceeds to operation 280. Otherwise, if a valid user authentication input is not received, method 200 continues to display the step-up authentication screen of operation 260 or the masking screen of operation 240.

At operation 280, method 200 restores the application screen of the mobile application. In other words, method 200 removes the masking screen or the step-up authentication screen that was previously covering the application screen of the mobile application, thereby allowing further interactions with the application screen. After operation 280, method 200 may end.

FIG. 3A illustrates an example mobile computing device 300 which may be used for mobile computing device 100. In particular embodiments, mobile computing device 300 includes a processor 310, a memory 320, a communication component 330 (e.g., antenna and communication interface for wireless communications), one or more input and/or output (I/O) components and/or interfaces 340, and one or more sensors 350. In particular embodiments, one or more I/O components and/or interfaces 340 may incorporate one or more sensors 350.

Processor 310 is any electronic circuitry, including, but not limited to a microprocessor, an application specific integrated circuits (ASIC), an application specific instruction set processor (ASIP), and/or a state machine, that communicatively couples to memory 320 and controls the operation of mobile computing device 300. Processor 310 may be 8-bit, 16-bit, 32-bit, 64-bit or of any other suitable architecture. Processor 310 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 310 may include other hardware that operates software to control and process information. Processor 310 executes software stored in memory to perform any of the functions described herein. Processor 310 controls the operation and administration of mobile computing device 300 by processing information received from the various components of mobile computing device 300. Processor 310 may be a programmable logic device, a microcontroller, a microprocessor, any suitable processing device, or any suitable combination of the preceding. Processor 310 is not limited to a single processing device and may encompass multiple processing devices.

Memory 320 may store, either permanently or temporarily, data, user preferences, rules, operational software, or other information for processor 310. Memory 320 may include any one or a combination of volatile or non-volatile local or remote devices suitable for storing information. For example, memory 320 may include random access memory (RAM), read only memory (ROM), magnetic storage devices, optical storage devices, or any other suitable information storage device or a combination of these devices. Memory 320 may store any suitable set of instructions, logic, or code embodied in a computer-readable storage medium. In particular embodiments, memory 320 may store instructions (e.g., a software application) executable by processor 310 to perform one or more of the functions described herein.

In particular embodiments, mobile computing device 300, such as a smartphone, may include various types of sensors 350, such as, for example and without limitation: touch sensors (disposed, for example, on a display of the device, the back of the device and/or one or more lateral edges of the device) for detecting a user touching the surface of mobile computing device 300 (e.g., using one or more fingers); an accelerometer for detecting whether mobile computing device 300 is moving and the speed of the movement; a thermometer for measuring the change in hotness or coldness near mobile computing device 300; a proximity sensor for detecting the proximity of mobile computing device 300 to another object (e.g., a hand, desk, or other object); a light sensor for measuring the ambient light around mobile computing device 300; an imaging sensor (e.g., camera) for capturing digital still images and/or video of objects near mobile computing device 300 (e.g., scenes, people, bar codes, QR codes, etc.); location sensors (e.g., Global Positioning System (GPS)) for determining the location (e.g., in terms of latitude and longitude) of mobile computing device 300; sensors for detecting communication networks within close proximity (e.g., near field communication, Bluetooth, RFID, infrared); chemical sensors; biometric sensors for biometrics-based (e.g., fingerprint, palm vein pattern, hand geometry, iris/retina, DNA, face, voice, olfactory, sweat) authentication of a user of mobile computing device 300; etc. This disclosure contemplates that mobile computing device 300 may include any applicable type of sensor. Sensors may provide various types of sensor data, which may be analyzed to determine the user's intention with respect to mobile computing device 300 at any given time.

In particular embodiments, a sensors hub 360 may optionally be included in mobile computing device 300. Sensors 350 may be connected to sensors hub 360, which may be a low power-consuming processor that controls sensors 350, manages power for sensors 350, processes sensor inputs, aggregates sensor data, and performs certain sensor functions. In addition, in particular embodiments, some types of sensors 350 may be connected to a controller 370. In this case, sensors hub 360 may be connected to controller 370, which in turn is connected to sensor 350. Alternatively, in particular embodiments, there may be a sensor monitor in place of sensors hub 360 for managing sensors 350.

In particular embodiments, in addition to the front side, mobile computing device 300 may have one or more sensors for performing biometric identification. Such sensors may be positioned on any surface of mobile computing device 300. In example embodiments, as the user's hand touches mobile computing device 300 to grab hold of it, the touch sensors may capture the user's fingerprints or palm vein pattern. In example embodiments, while a user is viewing the screen of mobile computing device 300, a camera may capture an image of the user's face to perform facial recognition. In example embodiments, while a user is viewing the screen of mobile computing device 300, an infrared scanner may scan the user's iris and/or retina. In example embodiments, while a user is in contact or close proximity with mobile computing device 300, chemical and/or olfactory sensors may capture relevant data about a user.

In particular embodiments, in addition to the front side, mobile computing device 300 may have touch sensors on the left and right sides. Optionally, mobile computing device 300 may also have touch sensors on the back, top, or bottom side. Thus, as the user's hand touches mobile computing device 300 to grasp it, the touch sensors may detect the user's fingers or palm touching mobile computing device 300.

In particular embodiments, mobile computing device 300 may have an accelerometer in addition to or instead of the touch sensors on the left and right sides. Sensor data provided by the accelerometer may also be used to estimate whether a user has picked up mobile computing device 300 from a resting position or placed mobile computing device 300 in a resting position, e.g., on a table or desk, display shelf, etc. When the user picks up mobile computing device 300 and brings it in front of the user's face, there may be a relatively quick increase in the movement speed of mobile computing device 300. This change in the device's movement speed may be detected based on the sensor data supplied by the accelerometer. Likewise, when the user places mobile computing device 300 to rest on an object, there may be a relatively quick decrease or stop in the movement speed of mobile computing device 300. This change in the device's movement speed may be detected based on the sensor data supplied by the accelerometer.

In particular embodiments, mobile computing device 300 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of mobile computing device 300. When mobile computing device 300 is stored on a shelf or in the user's bag, it may stay mostly in one orientation. However, when the user grasps mobile computing device 300 and lifts it up and/or moves it closer to bring it in front of the user's face, there may be a relatively quick change in the orientation of mobile computing device 300. The orientation of mobile computing device 300 may be detected and measured by the gyrometer.

In particular embodiments, mobile computing device 300 may have a light sensor. When mobile computing device 300 is stored in a user's pocket or case, it is relatively dark around mobile computing device 300. On the other hand, when the user brings mobile computing device 300 out of their pocket, it may be relatively bright around mobile computing device 300, for example during daytime or in well-lit areas. The sensor data supplied by the light sensor may be analyzed to detect when a significant change in the ambient light level around mobile computing device 300 occurs.

In particular embodiments, mobile computing device 300 may have a proximity sensor. The sensor data supplied by the proximity sensor may be analyzed to detect when mobile computing device 300 is in close proximity to a specific object, such as the user's hand. For example, mobile computing device 300 may have an infrared LED (light-emitting diode) 390 (i.e., proximity sensor) placed on its back side. When the user holds such a mobile device in the user's hand, the palm of the user's hand may cover infrared LED 390. As a result, infrared LED 390 may detect when the user's hand is in close proximity to mobile computing device 300.

A mobile computing device 300 may have any number of sensors of various types, and these sensors may supply different types of sensor data. Different combinations of the individual types of sensor data may be used together to detect and estimate a user's current intention with respect to mobile computing device 300 (e.g., whether the user really means to take mobile computing device 300 out of the user's pocket and use it). Sometimes, using multiple types of sensor data in combination may yield a more accurate, and thus better, estimation of the user's intention with respect to mobile computing device 300 at a given time than only using a single type of sensor data. Nevertheless, it is possible to estimate the user's intention using a single type of sensor data (e.g., touch-sensor data).

FIG. 3B illustrates the exterior of an example mobile computing device 300. Mobile computing device 300 has approximately six sides: front, back, top, bottom, left, and right. Touch sensors may be placed anywhere on any of the six sides of mobile computing device 300. For example, in FIG. 3B, a touchscreen incorporating touch sensors 380A is placed on the front of mobile computing device 300. The touchscreen may function as an input/output (I/O) component for mobile computing device 300. In addition, touch sensors 380B and 380C are placed on the left and right sides of mobile computing device 300, respectively. Touch sensors 380B and 380C may detect a user's hand touching the sides of mobile computing device 300. In particular embodiments, touch sensors 380A, 380B, 380C may be implemented using resistive, capacitive, and/or inductive touch sensors. The electrodes of the touch sensors 380A, 380B, 380C may be arranged on a thin solid piece of material or a thin wire mesh. In the case of capacitive touch sensors, there may be two types of electrodes: transmitting and receiving. These electrodes may be connected to a controller (e.g., controller 370 illustrated in FIG. 3A), which may be a microchip designed to drive the transmitting electrodes with electrical signals and measure the changes in capacitance from the receiving electrodes caused by a user's touches in order to detect the locations of the user touches.

The mobile computing device 300 of FIGS. 3A and 3B is an example for illustrative purposes only. In practice, a device may have any number of sides, and this disclosure contemplates devices with any number of sides. The touch sensors may be placed on any side of a device.

In particular embodiments, mobile computing device 300 may have a proximity sensor 390 (e.g., an infrared LED) placed on its back side. Proximity sensor 390 may be able to supply sensor data for determining its proximity, and thus the proximity of mobile computing device 300, to another object.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A mobile computing device comprising:
   one or more sensors, wherein the one or more sensors comprises an accelerometer;
   an electronic display;
   one or more memory units configured to store a mobile application; and
   a processor communicatively coupled to the one or more memory units, the processor configured to:
     determine whether the mobile computing device is unlocked;
     determine whether a user is logged into the mobile application;
     obtain data measured by the accelerometer on three axes;
     detect continuous movement based on data measured on two of the three axes;
     detect no movement based on the data measured on the remaining axis of the three axes;
     in response to detecting continuous movement on the two axes and no movement on the remaining axis, determine that the mobile computing device is still in a moving vehicle;
     in response to determining that the mobile computing device is still in a moving vehicle, determine that the mobile computing device is not in a threat scenario;
     when it is determined that the mobile computing device is unlocked while the user is logged into the mobile application, determine, by analyzing data from the one or more sensors, whether the mobile computing device is currently in a threat scenario, wherein the threat scenario indicates that the mobile computing device is exposed to unintended and malicious interactions;
     when it is determined that the mobile computing device is currently in the threat scenario, display a masking screen on the electronic display, the masking screen replacing or covering at least a portion of an application screen of the mobile application, the application screen of the mobile application comprising sensitive information of the user;
     display, in response to a user input on the masking screen, a step-up authentication screen on the electronic display, the step-up authentication screen comprising an authentication input area configured to receive an authentication input from the user;
     restore the application screen of the mobile application in response to receiving a valid authentication input from the user on the step-up authentication screen; and
     display either the masking screen or the step-up authentication screen on the electronic display in response to receiving an invalid authentication input from the user on the step-up authentication screen.

2. The mobile computing device of claim 1, wherein:
   the one or more sensors comprise:
     an accelerometer or a gyroscope; and
     a touchscreen sensor; and
   determining whether the mobile computing device is currently in the threat scenario comprises:
     analyzing data from the accelerometer or the gyroscope to determine whether the mobile computing device has moved within a first predetermined amount of time;
     analyzing data from the touchscreen sensor to determine whether the electronic display has been touched within a second predetermined amount of time; and
     determining that the mobile computing device is currently in the threat scenario when:
       it is determined that the mobile computing device has not moved within the first predetermined amount of time; and
       it is determined that the electronic display has not been touched within the second predetermined amount of time.

3. The mobile computing device of claim 1, wherein:
   the one or more sensors comprise an ambient light sensor; and
   determining whether the mobile computing device is currently in the threat scenario comprises:
     analyzing data from the ambient light sensor to determine whether the mobile computing device has been covered or placed inside an object for a predetermined amount of time; and
     determining that the mobile computing device is currently in the threat scenario when it is determined that the mobile computing device has been covered or placed inside the object for the predetermined amount of time.

4. The mobile computing device of claim 1, wherein:
   the one or more sensors comprise a front-facing camera; and
   determining whether the mobile computing device is currently in the threat scenario comprises:

analyzing data from the front-facing camera to determine whether a user's gaze has been broken for a predetermined amount of time; and
determining that the mobile computing device is currently in the threat scenario when it is determined that the user's gaze has been broken for the predetermined amount of time.

5. The mobile computing device of claim 1, wherein the authentication input from the user comprises:
a personal identification number;
a password; or
a biometric input.

6. A mobile computing device comprising:
one or more sensors, wherein the one or more sensors comprises an accelerometer;
an electronic display;
one or more memory units configured to store a mobile application; and
a processor communicatively coupled to the one or more memory units, the processor configured to:
determine whether the mobile computing device is unlocked;
determine whether a user is logged into the mobile application;
obtain data measured by the accelerometer on three axes;
detect continuous movement based on data measured on two of the three axes;
detect no movement based on the data measured on the remaining axis of the three axes;
in response to detecting continuous movement on the two axes and no movement on the remaining axis, determine that the mobile computing device is still in a moving vehicle;
in response to determining that the mobile computing device is still in a moving vehicle, determine that the mobile computing device is not in a threat scenario;
when it is determined that the mobile computing device is unlocked while the user is logged into the mobile application, determine, by analyzing data from the one or more sensors, whether the mobile computing device is currently in a threat scenario, wherein the threat scenario indicates that the mobile computing device is exposed to unintended and malicious interactions;
when it is determined that the mobile computing device is currently in the threat scenario, display a masking screen on the electronic display, the masking screen replacing or covering at least a portion of an application screen of the mobile application;
display, in response to a user input on the masking screen, a step-up authentication screen on the electronic display, the step-up authentication screen comprising an authentication input area configured to receive an authentication input from the user; and
restore the application screen of the mobile application in response to receiving a valid authentication input from the user on the step-up authentication screen.

7. The mobile computing device of claim 6, wherein:
the one or more sensors comprise:
an accelerometer or a gyroscope; and
a touchscreen sensor; and
determining whether the mobile computing device is currently in the threat scenario comprises:
analyzing data from the accelerometer or the gyroscope to determine whether the mobile computing device has moved within a first predetermined amount of time;
analyzing data from the touchscreen sensor to determine whether the electronic display has been touched within a second predetermined amount of time; and
determining that the mobile computing device is currently in the threat scenario when:
it is determined that the mobile computing device has not moved within the first predetermined amount of time; and
it is determined that the electronic display has not been touched within the second predetermined amount of time.

8. The mobile computing device of claim 6, wherein:
the one or more sensors comprise an ambient light sensor; and
determining whether the mobile computing device is currently in the threat scenario comprises:
analyzing data from the ambient light sensor to determine whether the mobile computing device has been covered or placed inside an object for a predetermined amount of time; and
determining that the mobile computing device is currently in the threat scenario when it is determined that the mobile computing device has been covered or placed inside the object for the predetermined amount of time.

9. The mobile computing device of claim 6, wherein:
the one or more sensors comprise a front-facing camera; and
determining whether the mobile computing device is currently in the threat scenario comprises:
analyzing data from the front-facing camera to determine whether a user's gaze has been broken for a predetermined amount of time; and
determining that the mobile computing device is currently in the threat scenario when it is determined that the user's gaze has been broken for the predetermined amount of time.

10. The mobile computing device of claim 6, wherein the application screen of the mobile application comprises sensitive information of the user.

11. The mobile computing device of claim 6, wherein the processor is further configured to display either the masking screen or the step-up authentication screen on the electronic display in response to receiving an invalid authentication input from the user on the step-up authentication screen.

12. The mobile computing device of claim 6, wherein the authentication input from the user comprises:
a personal identification number;
a password; or
a biometric input.

13. A method for securing a mobile computing device, the method comprising:
determining, by a processor of the mobile computing device, whether the mobile computing device is unlocked;
determining, by the processor of the mobile computing device, whether a user is logged into a mobile application running on the mobile computing device;
obtaining data measured by an accelerometer on three axes, wherein the accelerometer is disposed in the mobile computing device;

detecting continuous movement based on data measured on two of the three axes;

detecting no movement based on the data measured on the remaining axis of the three axes;

in response to detecting continuous movement on the two axes and no movement on the remaining axis, determining that the mobile computing device is still in a moving vehicle;

in response to determining that the mobile computing device is still in a moving vehicle, determining that the mobile computing device is not in a threat scenario;

when it is determined that the mobile computing device is unlocked while the user is logged into the mobile application, determining by the processor of the mobile computing device, by analyzing data from one or more sensors, whether the mobile computing device is currently in a threat scenario, wherein the threat scenario indicates that the mobile computing device is exposed to unintended and malicious interactions;

when it is determined that the mobile computing device is currently in the threat scenario, displaying, by the processor of the mobile computing device, a step-up authentication screen on an electronic display of the mobile computing device, the step-up authentication screen replacing or at least partially covering at least a portion of an application screen of the mobile application, the step-up authentication screen comprising an authentication input area configured to receive an authentication input from the user; and restoring, by the processor of the mobile computing device, the application screen of the mobile application in response to receiving a valid authentication input from the user on the step-up authentication screen.

14. The method of claim 13, wherein:

the one or more sensors comprise:

an accelerometer or a gyroscope; and a touchscreen sensor; and determining whether the mobile computing device is currently in the threat scenario comprises:

analyzing data from the accelerometer or the gyroscope to determine whether the mobile computing device has moved within a first predetermined amount of time;

analyzing data from the touchscreen sensor to determine whether the electronic display has been touched within a second predetermined amount of time; and determining that the mobile computing device is currently in the threat scenario when:

it is determined that the mobile computing device has not moved within the first predetermined amount of time; and it is determined that the electronic display has not been touched within the second predetermined amount of time.

15. The method of claim 13, wherein:

the one or more sensors comprise an ambient light sensor; and determining whether the mobile computing device is currently in the threat scenario comprises:

analyzing data from the ambient light sensor to determine whether the mobile computing device has been covered or placed inside an object for a predetermined amount of time; and determining that the mobile computing device is currently in the threat scenario when it is determined that the mobile computing device has been covered or placed inside the object for the predetermined amount of time.

16. The method of claim 13, wherein:

the one or more sensors comprise a front-facing camera; and determining whether the mobile computing device is currently in the threat scenario comprises:

analyzing data from the front-facing camera to determine whether a user's gaze has been broken for a predetermined amount of time; and determining that the mobile computing device is currently in the threat scenario when it is determined that the user's gaze has been broken for the predetermined amount of time.

17. The method of claim 16, wherein analyzing data from the front-facing camera to determine whether the user's gaze has been broken comprises utilizing an eye-tracking algorithm.

18. The method of claim 13, wherein the application screen of the mobile application comprises sensitive or personal information of the user.

19. The method of claim 13, wherein the processor is further configured to continue displaying the step-up authentication screen on the electronic display in response to receiving an invalid authentication input from the user.

20. The method of claim 13, wherein the authentication input from the user comprises:

a personal identification number;

a password; or a biometric input.

\* \* \* \* \*